United States Patent
Watanabe et al.

(10) Patent No.: US 9,290,276 B2
(45) Date of Patent: Mar. 22, 2016

(54) LIGHTNING PROTECTION FASTENER AND AIRCRAFT

(71) Applicant: MITSUBISHI AIRCRAFT CORPORATION, Aichi (JP)

(72) Inventors: Yasunori Watanabe, Tokyo (JP); Takamitsu Himeno, Tokyo (JP); Hideo Yamakoshi, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 139 days.

(21) Appl. No.: 14/051,888

(22) Filed: Oct. 11, 2013

(65) Prior Publication Data

US 2015/0102160 A1 Apr. 16, 2015

(30) Foreign Application Priority Data

Oct. 15, 2012 (JP) ................... 2012-227650

(51) Int. Cl.
  *B64D 45/02* (2006.01)
  *F16B 33/00* (2006.01)
  *F16B 37/14* (2006.01)

(52) U.S. Cl.
  CPC .............. *B64D 45/02* (2013.01); *F16B 33/004* (2013.01); *F16B 37/14* (2013.01)

(58) Field of Classification Search
  CPC .. B64D 45/02; B64C 2001/0072; B64C 3/26; B64C 2001/0081; H05F 3/02; H05F 3/04; H05F 3/00; F16B 33/004; F16B 37/14
  USPC ............................ 244/1 A; 361/212, 218, 217
  See application file for complete search history.

(56) References Cited

U.S. PATENT DOCUMENTS

| 4,429,341 A * | 1/1984 | King ............................ 361/117 |
| 4,502,092 A * | 2/1985 | Bannink et al. ................. 361/218 |
| 4,630,168 A * | 12/1986 | Hunt ............................ 361/218 |
| 4,755,904 A * | 7/1988 | Brick ............................ 361/117 |
| 5,175,665 A * | 12/1992 | Pegg ............................ 361/218 |

(Continued)

FOREIGN PATENT DOCUMENTS

| EP | 2500273 A2 * | 9/2012 |
| JP | 2011-068228 A | 4/2011 |

(Continued)

OTHER PUBLICATIONS

Japanese Office action for Application No. 2012-227650 dated Aug. 25, 2014.

*Primary Examiner* — Brian M O'Hara
*Assistant Examiner* — Assres H Woldemaryam
(74) *Attorney, Agent, or Firm* — Pearne & Gordon LLP

(57) ABSTRACT

An aircraft of the present invention includes an outer panel 4 made of a fiber reinforced plastic material, a support member 5, and a lightning protection fastener 1. The fastener 1 includes a metal fastener body 2 having a shaft portion 10 and a head portion 20, and an insulating member 30 made of an insulating plastic material and mounted to the head portion 20. The portion 20 has a frustoconical-shaped fastener seat surface 211. The panel 4 includes a receiving surface 41 conforming to the fastener seat surface 211. The member 30 includes an insulating seat surface 321 retracted from a plane of the fastener seat surface 211 such that, when a portion 41A of the receiving surface 41 which is opposed to the fastener seat surface 211 is depressed, an insulating seat surface 321 comes into contact with the receiving surface 41.

7 Claims, 7 Drawing Sheets

(56) References Cited

U.S. PATENT DOCUMENTS

| | | | |
|---|---|---|---|
| 7,050,286 B2* | 5/2006 | Pridham et al. | 361/218 |
| 7,740,434 B2* | 6/2010 | Kamino et al. | 411/372.5 |
| 8,092,134 B2* | 1/2012 | Oguri et al. | 411/372.5 |
| 8,186,614 B2* | 5/2012 | Sanchez-Brunete et al. | 244/1 A |
| 8,342,805 B2* | 1/2013 | Mendez Hernandez et al. | 416/146 R |
| 8,654,500 B2* | 2/2014 | Satake | 361/218 |
| 2010/0224724 A1* | 9/2010 | Kamino et al. | 244/1 A |
| 2010/0320315 A1* | 12/2010 | Kashiwagi et al. | 244/1 A |
| 2011/0142567 A1* | 6/2011 | Haylock et al. | 411/360 |
| 2011/0226896 A1* | 9/2011 | Bessho et al. | 244/1 A |
| 2012/0236457 A1* | 9/2012 | Yamakoshi et al. | 361/218 |

FOREIGN PATENT DOCUMENTS

| | | | |
|---|---|---|---|
| JP | 2011-079383 A | | 4/2011 |
| JP | 2011079383 | * | 4/2011 |

* cited by examiner

LIGHTNING PROTECTION FASTENER AND AIRCRAFT

BACKGROUND OF THE INVENTION

1. Field of the Invention

The present invention relates to an aircraft and to a lightning protection fastener for fastening structural members of an aircraft.

2. Description of the Related Art

A wing partly constituting an airframe of an aircraft generally has a hollow structure, and the inner space of the wing is also used as a fuel tank. An outer panel (wing surface panel) forming a wing surface is fixed to a support member for supporting the backside of the outer panel with a fastener (fastening member).

In most cases, outer panels are made of carbon fiber reinforced plastics (composite material), which has light weight, high strength, and improved durability. Use of outer panels made of carbon fiber reinforced plastics, which has low conductivity, causes lightning current at the time of lightning strikes to concentrate to metallic fasteners. This tends to cause a high current exceeding an allowable current level to flow along interfaces between elements including fasteners, outer panels, and support members, thereby allowing an electric discharge to occur in the vicinity of those interfaces. The electric discharge abruptly raises the temperature of the elements such as fasteners and support members, which can cause parts of those elements to be molten and scattered.

In order for an aircraft to have a sufficient explosion-proof performance at the time of lightning strikes, it is necessary to keep the discharge spark and scattered molten substances away from fuel vapor to prevent the occurrence of flames. One possible method for achieving this is to cover fasteners with an insulating member. This can prevent lightning current from flowing to fasteners, thereby preventing the occurrence of electric discharges.

U.S. Unexamined Patent Application, Publication No. 2010/0224724 teaches a fastener with an insulating member of an insulating plastic material attached to its head portion located on the outer surface side of an outer panel. The head portion of the fastener has a substantially frustoconical shape with its diameter increasing with distance from a shaft portion of the fastener, and is accommodated within a space defined by a receiving surface formed in the outer panel. The insulating member is engaged in the outer periphery of the head portion of the fastener, and has a seat surface formed such that it is flush with the seat surface of the fastener when the insulating member is engaged to the fastener.

An outer panel made of fiber reinforced plastics has a lower stiffness than a metallic fastener. FIG. 7 schematically illustrates an outer panel 100, a support member 110, and a fastener 80. When the fastener 80 is tightened, a receiving surface 101 of the outer panel 100 is pressed by a seat surface 81 of the fastener 80 and slightly depressed. An insulating member 90 has a seat surface 91 formed to be flush with the seat surface 81. When the receiving surface 101 is depressed, a shaft-side portion 91A of the seat surface 91 is pressed hard against the receiving surface 101 of the outer panel 100 by a convex engagement portion (click) 82 of the fastener 80. On the other hand, an outer-surface side portion 91B of the seat surface 91 is warped upward relative to a center portion 92 of the insulating member 90 by friction against the receiving surface 101. While an airframe of an aircraft requires high smoothness so as to lower air resistance as much as possible, the above mentioned deformation of the insulating member 90 makes it difficult to attain the desired smoothness.

In view of the above technical problem, it is an object of the present invention to provide required smoothness of an airframe of an aircraft that includes an outer panel made of fiber reinforced plastics, and a fastener for fastening the outer panel to a support member where the fastener is equipped with an insulating member.

SUMMARY OF THE INVENTION

The present invention provides a lightning protection fastener for fastening an outer panel to a support member, the outer panel being made of a fiber reinforced plastic material, and the support member supporting the backside of the outer panel, where the lightning protection fastener includes a fastener body made of a metal, the fastener body including a shaft portion passing through the outer panel and the support member, and a head portion located on the outer surface side of the outer panel; and an insulating member made of an insulating plastic material and mounted to the head portion.

The head portion has a seat surface to be in contact with the outer panel where the seat surface forms a frustoconical shape.

The outer panel has a receiving surface conforming to the seat surface.

The present invention features the insulating member having a contact surface which is retracted from a plane of the seat surface of the fastener body such that, when a portion of the receiving surface which is opposed to the seat surface is depressed, the contact surface comes into contact with the receiving surface.

As the contact surface of the insulating member is retracted from the plane of the seat surface of the fastener body, tightening the fastener body causes the seat surface of the fastener body to come into contact with the receiving surface of the outer panel before the contact surface of the insulating member contacts. At this time, the contact surface is retracted from the receiving surface. Thus, when the fastener body is further tightened and the receiving surface is pressed by the seat surface and depressed, the insulating member, even a portion thereof that engages the head portion (inner portion of the contact surface), is not pressed hard against the receiving surface and thus it comes into contact with the receiving surface with a proper contact pressure. Thus, the insulating member remains flat without being warped upward at its outer edge. Thus, the present invention can ensure the smoothness of the outer surface of the outer panel.

Generally, an insulating sealant is applied onto the outer periphery of the lightning protection fastener before the lightning protection fastener is inserted into a through-hole for fastening where the through-hole is defined in the outer panel and the support member. The sealant provided between the lightning protection fastener and the outer panel and between the lightning protection fastener and the support member prevents the entrance of water, gas, dust, etc. into the aircraft from the outside, and improves dielectric strength of lightning protection fastener.

Meanwhile, the depression of the receiving surface creates a gap between the insulating member, the outer panel, and the fastener body. If the gap is not filled with the sealant, an electric discharge tends to occur in the unfilled gap.

According to the present invention, such a gap is filled with a sealant by the following process.

When the seat surface comes in contact with the receiving surface, there is a space between the contact surface and the receiving surface, and the space retains a corresponding amount of sealant fluid between the contact surface and the receiving surface. When the fastener body is further tightened, the receiving surface is gradually depressed to form a gap. On the other hand, the space between the contact surface and the receiving surface gradually becomes narrowed, which forces the sealant fluid in the space to flow into the gap between the insulating member, the outer panel, and the fastener body, allowing the gap to be sealed (filled) with the sealant. Thus, this process can prevent the gap from being left unfilled, thereby preventing the occurrence of electric discharges.

Accordingly, the present invention includes an embodiment in which the gap created by the depression of the receiving surface between the insulating member, the outer panel, and the fastener body is filled with an insulating sealant.

Throughout the specification of the present application, a "contact" state between the seat surface of the fastener body and the receiving surface and between the contact surface of the insulating member and the receiving surface is defined to include a state in which a sealant exists in fine spaces in their interfaces created by unevenness of the surfaces.

According to the present invention, the contact surface preferably comes into contact with the receiving surface with a predetermined contact pressure.

Also, according to the present invention, the contact surface is preferably formed to be spaced a separation distance apart from an extended line of the seat surface and in parallel relationship with the seat surface.

In a preferred embodiment of an aircraft of the present invention, the insulating sealant is provided for filling a space between the receiving surface and the insulating member, where the space is located in the outer-surface side from the contact surface.

This ensures the outer surface of the outer panel has more sufficient smoothness.

The present invention provides an aircraft wherein the aircraft includes an outer panel made of a fiber reinforced plastic material, a support member for supporting the backside of the outer panel, and the above described lightning protection fastener for fastening the outer panel to the support member.

According to the present invention, the above described configuration of a fastener for fastening an outer panel of fiber reinforced plastics to a support member, the fastener equipped with an insulation member, can ensure the smoothness of an airframe of an aircraft.

In addition, a gap created by the depression of a receiving surface of the outer surface is filled with a sealant, which can prevent the formation of an unfilled space in which an electric discharge can occur, thereby improving explosion-proof performance of the aircraft.

DETAILED DESCRIPTION OF THE PREFERRED EMBODIMENTS

The present invention will now be described with reference to the embodiment shown in the accompanying drawings.

Figure 1:
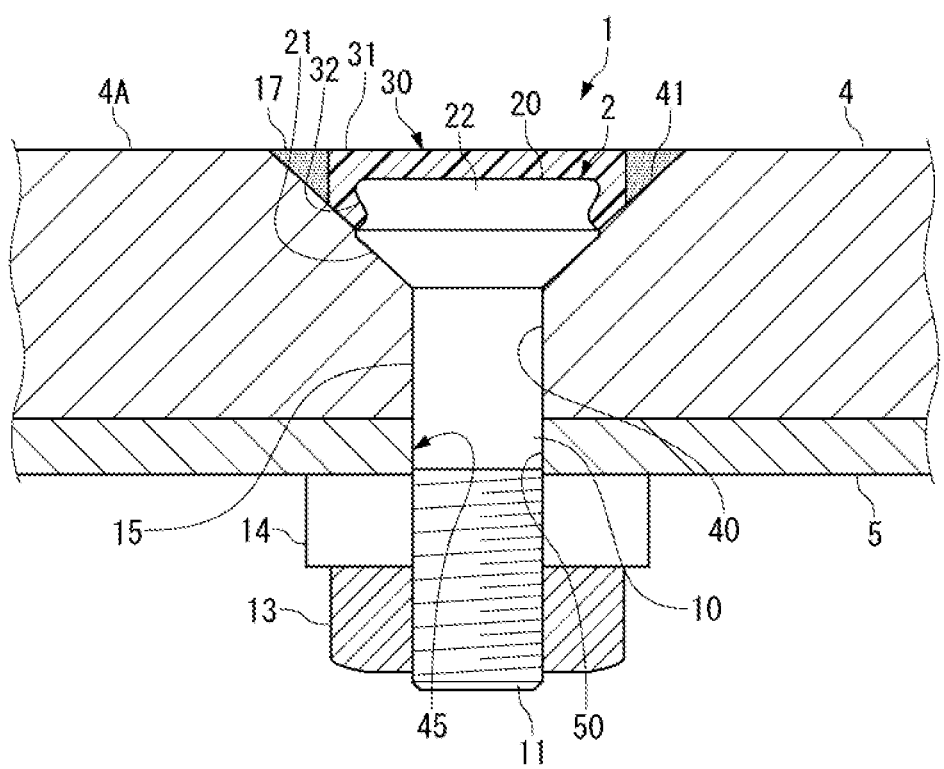
FIG. 1 is a cross sectional view illustrating a lightning protection fastener and a structural member of an aircraft in accordance with an embodiment of the present invention.

A lightning protection fastener 1 illustrated in FIG. 1 is used to fasten an outer panel 4 partly constituting the main wings, fuselage, or the like of an aircraft to a support member 5.

The outer panel 4 is a structural member forming an outer surface of the main wings, fuselage, or the like, and formed of a fiber reinforced plastic material such as carbon fiber reinforced plastics (CFRP) obtained by hardening carbon fibers with plastics, and glass fiber reinforced plastics (GFRP) obtained by hardening glass fibers with plastics.

The support member 5 is a structural member for supporting the backside of the outer panel 4, and is formed of metal including aluminum alloy and titanium alloy, or fiber reinforced plastics such as CFRP. A plurality of the lightning protection fasteners 1 is used to fasten the outer panel 4 to the support member 5.

The lightning protection fastener 1 includes a fastener body 2 made of metal which has a shaft portion (shank) 10 and a head portion (flush head) 20 having a flat headed shape, and an insulating member 30 mounted to the head portion 20. The insulating member 30 covering the head portion 20 prevents lightning current from flowing to the fastener body 2.

The fastener body 2 is made of metal with high specific strength such as titanium alloy and nickel alloy.

The shaft portion 10 is inserted into a through-hole 45 defined in the outer panel 4 and the support member 5. A tip 11 of the shaft portion 10, which protrudes out of the back surface of the support member 5, is threaded into an inner circumferential surface of a collar (nut, fixture) 13, thereby allowing the outer panel 4 and the support member 5 to be fixed between the head portion 20 and the collar 13.

An insulating washer 14 is interposed between the support member 5 and the collar 13.

Next, the head portion 20 of the fastener body 2 and its peripheral structure will be described.

As shown in FIG. 1, the head portion 20 has a fastener inclined portion 21 with its diameter increasing with distance from the shaft portion 10, and a fastener top portion 22 which is continuous with the fastener inclined portion 21 and to which the insulating member 30 is mounted.

Figure 2:
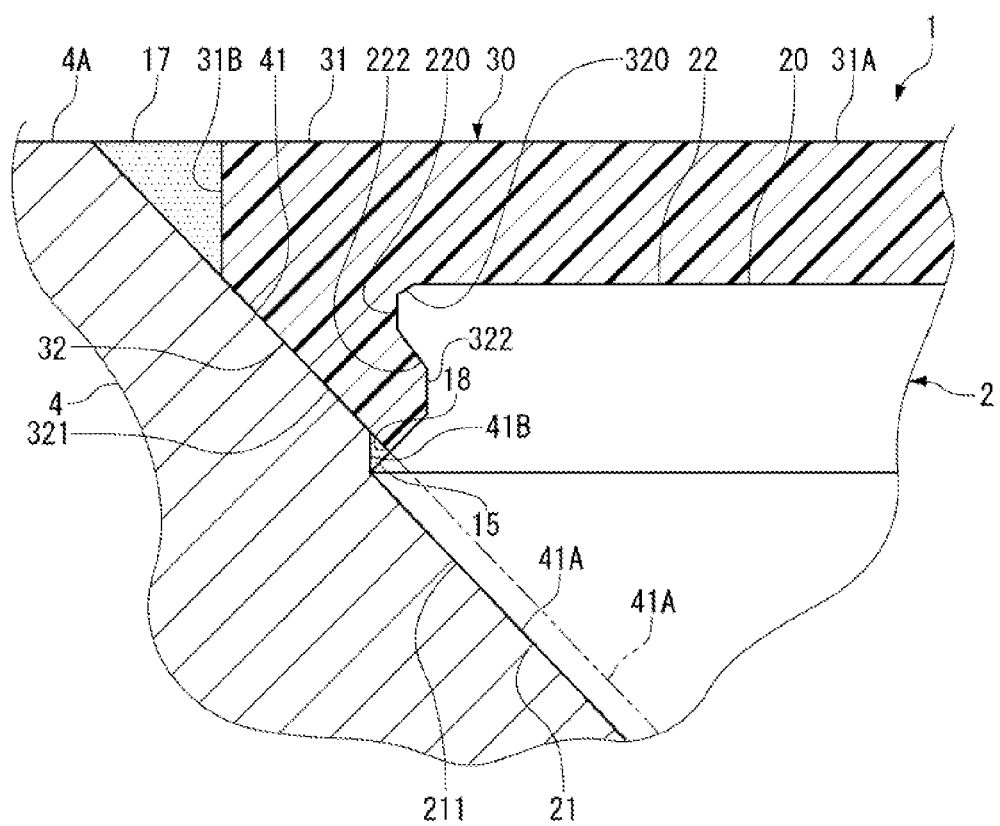
FIG. 2 is an enlarged view of an essential part of FIG. 1.

As shown in FIG. 2, the fastener inclined portion 21 has a fastener seat surface 211 formed in its frustoconical annular areas, and the fastener seat surface 211 is supported by a receiving surface 41 formed in the outer surface 4A side of the outer panel 4.

The fastener top portion 22 is provided with a convex engagement portion 220 that protrudes radially outward and circumferentially extends around the entire periphery of the fastener top portion 22. A concave portion 222 is provided adjacent to the convex engagement portion 220, and the concave portion 222 is continuous with the fastener seat surface 211.

The insulating member 30 made of an insulating plastic material is provided with an insulating top portion 31 having a disk-like shape with a larger diameter than the fastener top portion 22, and an insulating inclined portion 32 which protrudes out of the back side of the periphery of the insulating top portion 31. The entire insulating member 30 is accommodated within a space defined by the receiving surface 41.

The insulating top portion 31 conformingly overlies on the surface of the fastener top portion 22. The thickness of the insulating top portion 31 is determined such that, when the receiving surface 41 is pressed by the fastener body 2 and depressed, the surface 31A of the insulating top portion 31 is flush with the outer surface 4A of the outer panel 4, as explained below.

The insulating inclined portion 32 has its diameter increasing with distance from the shaft portion 10 in the same manner as the fastener inclined portion 21, and defines an insulating seat surface 321 in its frustoconical annular area where the insulating seat surface 321 is continuous with a side surface 31B of the insulating top portion 31.

Figure 3:
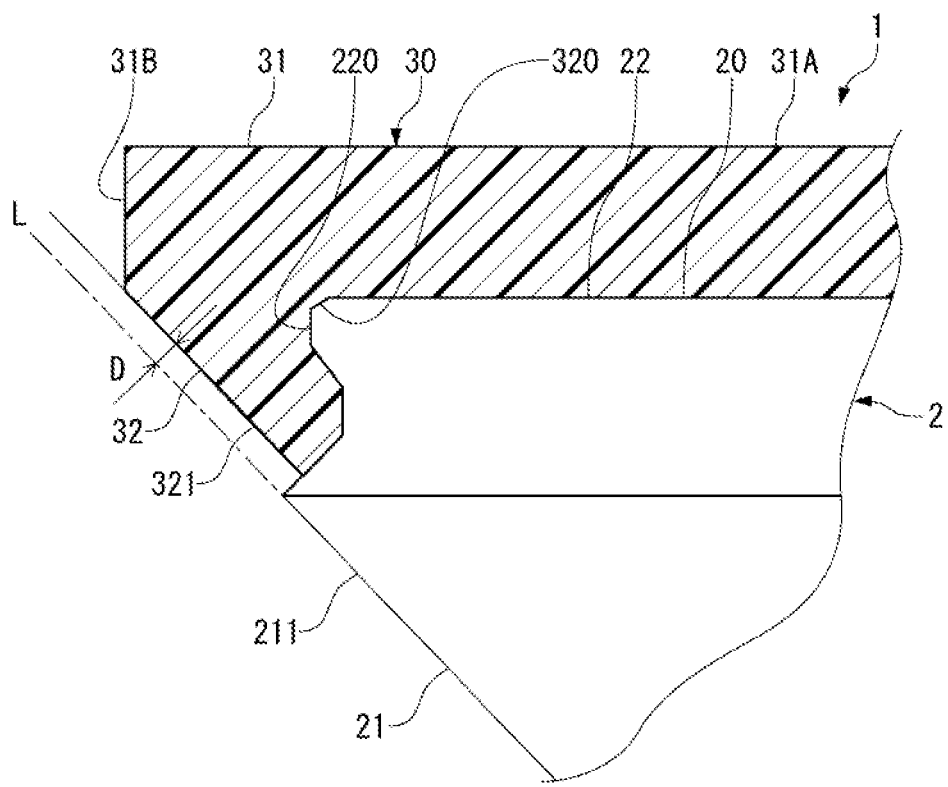
FIG. 3 is an enlarge view of the lightning protection fastener alone (a state in which it is not used to fasten any structural member)

As shown in FIG. 3, the insulating seat surface 321 is formed to be spaced a separation distance D apart from an extended line L (shown by a dashed-dotted line) of the fastener seat surface 211 and in parallel relationship with the fastener seat surface 211. Thus, the insulating seat surface 321 is retracted from a plane of the fastener seat surface 211.

The insulating inclined portion 32 is provided with a concave engagement portion 320 that is depressed radially inward and extends around the entire inner circumference thereof. Also, a convex portion 322 is provided adjacent to the concave engagement portion 320, and the convex portion 322 is continuous with the insulating seat surface 321. The concave engagement portion 320 is engaged with the convex engagement portion 220 of the fastener top portion 22, which prevents the detachment of the insulating member 30 from the fastener body 2.

Exemplary materials of the insulating member 30 include thermohardening resins, and thermoplastic resins such as thermoplastic polyimide resin, polyether-imide (PEI), polyether-ether-ketone (PEEK), polyphenylsulfide (PPS), polyamide-imide (PAI), and the like. The material of the insulating member 30 is chosen from considerations of heat-resistance, strength, dielectric strength, and formability. The insulating member 30 may be formed by an insert injection molding process in which the fastener body 2 is placed in a molding die.

As shown in FIG. 1, the outer panel 4 defines an outer panel through-hole 40 extending in the direction of the thickness thereof, and the receiving surface 41 widening out from the outer panel through-hole 40 toward the outer surface 4A.

The outer panel through-hole 40 together with a support member through-hole 50 which is arranged coaxially with the outer panel through-hole 40 and extends through the support member 5 forms the through-hole 45 into which the shaft portion 10 is inserted.

The receiving surface 41 is formed so as to conform to the fastener seat surface 211. As the outer panel 4 has a lower stiffness than the fastener body 2, tightening the fastener body 2 causes a portion of the receiving surface 41 which is opposed to the fastener seat surface 211 (depressed surface 41A) to be pressed by the fastener seat surface 211, and depressed toward the tip 11. FIG. 2 shows the portion of the receiving surface before it is depressed, depicted in a dashed-two dotted line.

Figure 4A:
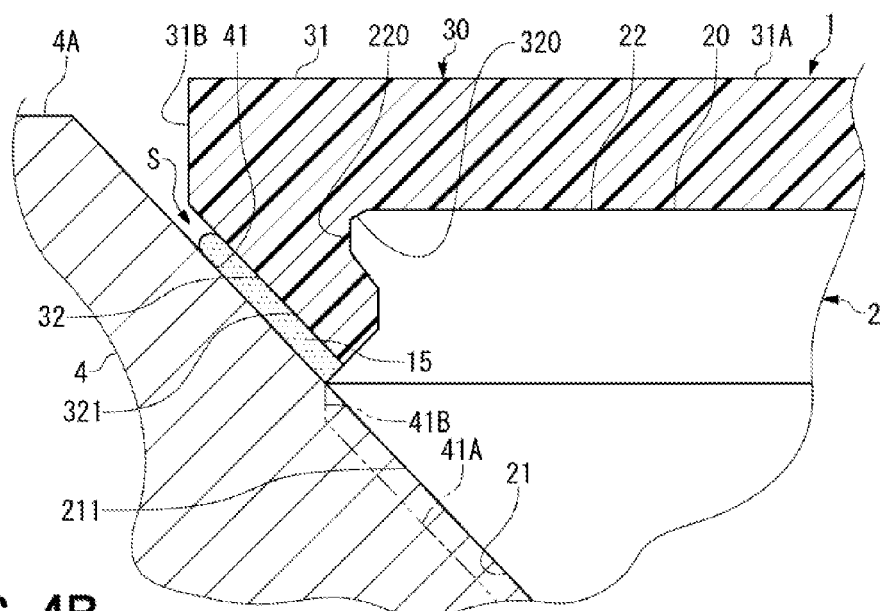
FIG. 4A shows a process in which the lightning protection fastener according to the embodiment is tightened.

As explained previously, the insulating seat surface 321 is formed to be spaced the separation distance D apart from the extended line L of the fastener seat surface 211. Thus, when tightening the fastener body 2 causes the fastener seat surface 211 to come into contact with the receiving surface 41, the insulating seat surface 321 is located at a position retracted from the receiving surface 41 by a distance equivalent to the separation distance D (FIG. 4A).

As shown in FIG. 2, when the fastener body 2 is further tightened, the receiving surface 41 is pressed and depressed to a predetermined amount of the depression, and the separation distance D is determined to be a little shorter than the amount of the depression so that the insulating seat surface 321 comes into contact with the receiving surface 41 with a predetermined contact pressure. In one example, for the fastener body 2 with the shaft portion 10 having a diameter (nominal diameter) of ¼ inch, the separation distance D is about 0.1 mm.

As the insulating member 30 has a lower stiffness than the outer panel 4, the other part of the receiving surface 41 than the depressed surface 41A is not depressed. A gap 18 is formed between the depressed surface 41A and a rising surface 41B which connects the depressed surface to the other portion, the fastener seat surface 211, and the insulating seat surface 321.

Predetermined clearances are provided between the inner circumference of the through-hole 45 and the shaft portion 10, and between the inner circumference of the collar 13 and the shaft portion 10. Thus, the clearances are filled with an insulating sealant 15. Polyphenylsulfide (PPS) can be suitably used as the insulating sealant 15.

The sealant 15 also fills fine spaces (not shown) between the fastener seat surface 211 and the receiving surface 41 created by unevenness of the surfaces 211 and 41, fine spaces (not shown) between the insulating seat surface 321 and the receiving surface 41 created by unevenness of the surfaces 321 and 41, and the above-mentioned gap 18. Thus, a microscopically small amount of the sealant 15 is provided between the fastener seat surface 211 and the receiving surface 41, and between the insulating seat surface 321 and the receiving surface 41. However, according to the previously described definition, the fastener seat surface 211 and the receiving surface 41 are in a contact state, and the insulating seat surface 321 and the receiving surface 41 are also in a contact state.

Furthermore, a sealant 17 of the same type as the sealant 15 is provided between the side surface 31B of the insulating top portion 31 and the receiving surface 41. The sealant 17 renders the entire outer surface 4A of the outer panel 4 as a smooth surface.

The sealants 15 and 17 are injected between the elements as a fluid including its ingredients dispersed in a solvent, followed by being dried and solidified.

A procedure for fastening the outer panel 4 to the support member 5 with the lightning protection fastener 1 will be described below.

The procedure involves, in the following order, applying the sealant 15 in fluid form onto the shaft portion 10 and the head portion 20, inserting the lightning protection fastener 1 into the through-hole 45, placing the washer 14 onto the tip 11 of the shaft portion 10, mounting the collar 13 to the tip 11, and then rotating the collar 13 with a tool while preventing rotation of the fastener body 2 to tighten the fastener body 2.

Tightening the fastener body 2 causes the fastener seat surface 211 to come into contact with the receiving surface 41 before the insulating seat surface 321 contact the surface the receiving surface 41, where the insulating seat surface 321 is formed to be spaced the separation distance D apart from the extended line L of the fastener seat surface 211 as described earlier (FIG. 4A). At this time, the insulating member 30 is retracted from the receiving surface 41 at a position spaced the separation distance D apart from the receiving surface 41 to form a space S between the insulating member 30 and the receiving surface 41.

This prevents the insulating member 30 from being pressed hard against the receiving surface 41 when the fastener body 2 is further tightened and the receiving surface 41 is pressed by the fastener seat surface 211 and depressed (FIG. 2). This further prevents the outer-surface side portion of the insulating member 30 from being warped upward, thereby allowing the insulating top portion 31 to remain flat. Moreover, the entire insulating seat surface 321 comes into parallel contact with the receiving surface 41 with a predetermined contact pressure.

As described above, tightening the lightning protection fastener 1 causes the depression of the receiving surface 41, which results in the formation of the gap 18 defined by the insulating member 30, the outer panel 4, and the fastener body 2.

A process for filling the gap 18 with the sealant 15 will be described below.

As shown in FIG. 4A, when the fastener body 2 with the fluid sealant 15 applied thereon is tightened, the fastener body 2 comes into contact with the receiving surface 41. At this time, the space S is created between the insulating member 30 and the receiving surface 41, and the space S retains a corresponding amount of the fluid sealant 15 between the insulating seat surface 321 and the receiving surface 41.

When the fastener body 2 is further tightened, the receiving surface 41 is gradually depressed to form the gap 18 (FIG. 2) while the space S gradually becomes narrowed. The insulating seat surface 321 comes close to the receiving surface 41 maintaining their parallel relationship with each other, and then the entire insulating seat surface 321 comes into parallel contact with the receiving surface 41 with a predetermined contact pressure. This process forces the fluid sealant 15 between the insulating seat surface 321 and the receiving surface 41 to flow out of the space, and part of the sealant flows into the gap 18, thereby allowing the gap 18 to be sufficiently filled with the fluid sealant 15, which can prevent the gap 18 from being left unfilled.

Figure 4B:
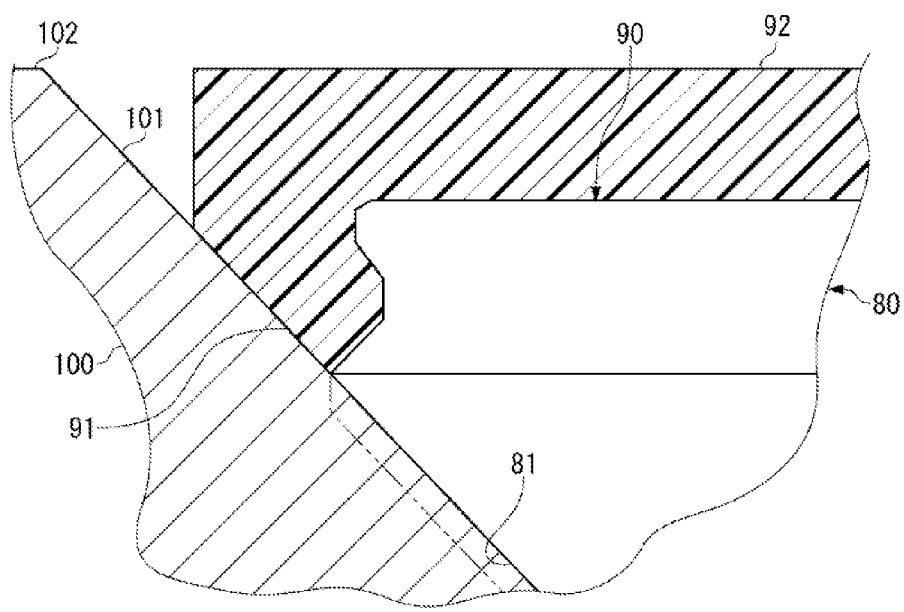
FIG. 4B shows a process in which a lightning protection fastener of the prior art is tightened.

For comparison, referring to FIG. 4B, a structure of the prior art is discussed as to whether or not such a gap is filled with a sealant.

As the seat surface 81 of the fastener 80 is formed to be flush with the seat surface 91 of the insulating member 90, the seat surface 91 comes into contact with the receiving surface 101 at the same time as the seat surface 81 contacts the receiving surface 101. At this time, a small amount of sealant fluid is retained between the seat surfaces 81, 91 and the receiving surface 101. The amount of the sealant retained between the seat surfaces 81, 91 and the receiving surface 101 is determined at the time of their contact, and the fluid sealant will not be replenished any further.

After completion of tightening the lightning protection fastener 1, an insulating cap (not shown) is placed over the collar 13 and the washer 14, and secured to the support member 5 with the peripheral edge of the opening of the cap tightly adhered to the support member 5.

Then, the sealant 17 is provided along the outer surface 4A of the outer panel 4. Specifically, the fluid sealant 17 is provided between the side surface 31B of the insulating top portion 31 and the receiving surface 41, and then leveled off so that the fluid sealant is flush with the outer surface 4A. This allows the entire outer surface 4A of the outer panel 4 to have sufficient smoothness.

In this manner, the process for fastening structural members with the lightning protection fastener 1 and its accompanying works are completed.

In this embodiment of the present invention, the insulating member 30 covering the head portion 20 of the fastener body 2 prevents lightning current from flowing through the lightning protection fastener 1 when a lightning strikes on the outer panel 4. This can prevent the occurrence of electric discharges in the vicinity of interfaces between the fastener body 2, the outer panel 4, the support member 5, and the collar 13.

Moreover, the sealant 15 or 17 fills the spaces between members so that the members are in close contact with one another with the sealant 15 or 17 interposed therebetween. If there is a gap between the members that is not filled with the sealant 15 or 17, an electric discharge may occur in the gap. However, in this embodiment, as the gap 18 is prevented from being left unfilled as described above, the occurrence of electric discharges can be prevented.

Even if high current flows through the fastener body 2 and an electric discharge occurs in the vicinity of the tip 11, the spark is contained within the cap.

The above multiple measures against electric discharges ensure explosion-proof performance, preventing fuel ignition.

According to this embodiment of the present invention, as described above, the feature of the insulating seat surface 321 that is retracted from the plane of the fastener seat surface 211 resolves the two problems associated with the unavoidable depression of the receiving surface 41 of the outer panel 4 made of fiber reinforced plastics.

First, since the space S is provided between the insulating seat surface 321 and the receiving surface 41 before the depression is formed, the insulating seat surface 321 is not pressed hard against the receiving surface 41, allowing the insulating member 30 to remain flat while the fastener body 2 bites into the receiving surface 41. This can ensure the smoothness required for an airframe of an aircraft.

Second, the space S which exists before the formation of the depression retains the sealant 15 in the fluid form. Thus, when the space S becomes narrowed as the depression proceeds, the fluid retained between the insulating seat surface 321 and the receiving surface 41 is forced to flow into the gap 18, allowing the gap to be filled with the sealant. This can prevent the occurrence of electric discharges, thereby improving explosion-proof performance of the aircraft.

The above two problems cannot be solved by a simple modification of a structure of the prior art which lacks the insulating seat surface 321 retracted from the plane of the fastener seat surface 211 where the modification was made by providing the insulating top portion 31 with an inclined portion having an amount of inclination equivalent to the upward warp of the insulating member 30 so that the resulting outer surface of the outer place can attain smoothness. This is because the fastening force of a fastener varies with change in the environment, resulting in the failure to meet the requirement of smoothness.

In this embodiment of the present invention, the separation distance D, which is an amount of the retraction of the insulating seat surface 321, is determined so that, when the contact pressure between the insulating seat surface 321 and the receiving surface 41 decreases due to the contraction of the sealant 15 at low temperatures in midair, the contact pressure remains sufficient to prevent formation of a space between the opposed surfaces. This can prevent the entrance of water, gas, dust, etc. into the aircraft from the outside through the space, and can prevent the discharge of the sealant 15 contained in the gap 18 through the space as well.

In addition to the above, different embodiments of the present invention may be implemented without departing from the spirit and scope thereof, for instance, by employing some features of the above embodiment without a corresponding use of others features, or replacing some features with other features.

While, in the above embodiment, the insulating seat surface 321 is formed to be in parallel relationship with the fastener seat surface 211, these surfaces may not be in parallel relationship with each other.

Figure 5:
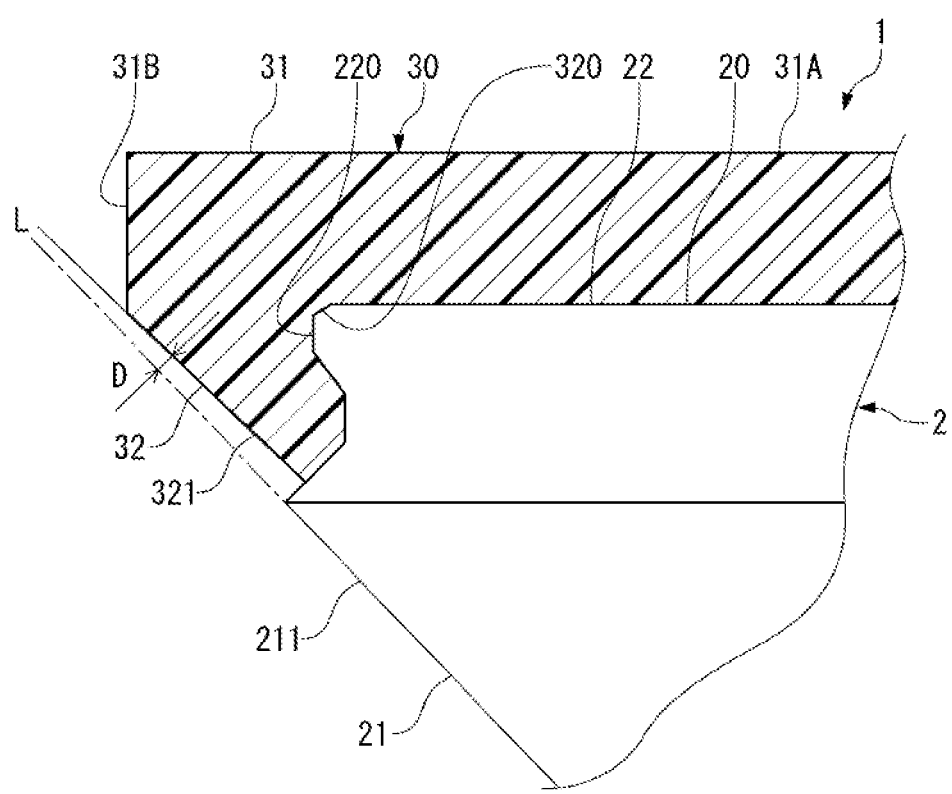
FIG. 5 is an enlarged view of an essential part of a variation of the present invention.

In a specific embodiment, as shown in FIG. 5, the insulating seat surface 321 is inclined such that the separation distance D from the extended line L of the fastener seat surface 211 to the insulating seat surface 321 becomes smaller with increasing distance from the border between the fastener seat surface 211 and the insulating seat surface 321, which allows the insulating seat surface 321 to contact the receiving surface 41 (FIG. 2) with a higher contact pressure at locations close to the outer surface 4A. This also enables smooth introduction of the sealant 15 into the gap 18.

The embodiment of FIG. 5 includes the insulating seat surface 321 retracted from the plane of the fastener seat surface 211, and thus can achieve the same effects as the above described embodiment.

Figure 6:
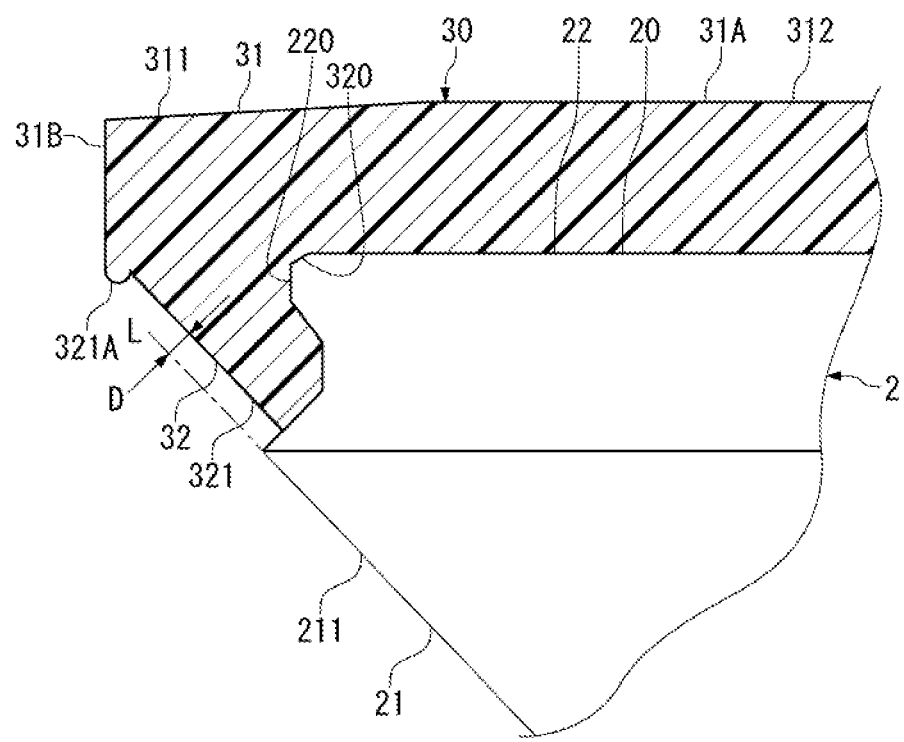
FIG. 6 is an enlarged view of an essential part of another variation of the present invention.
Figure 7:
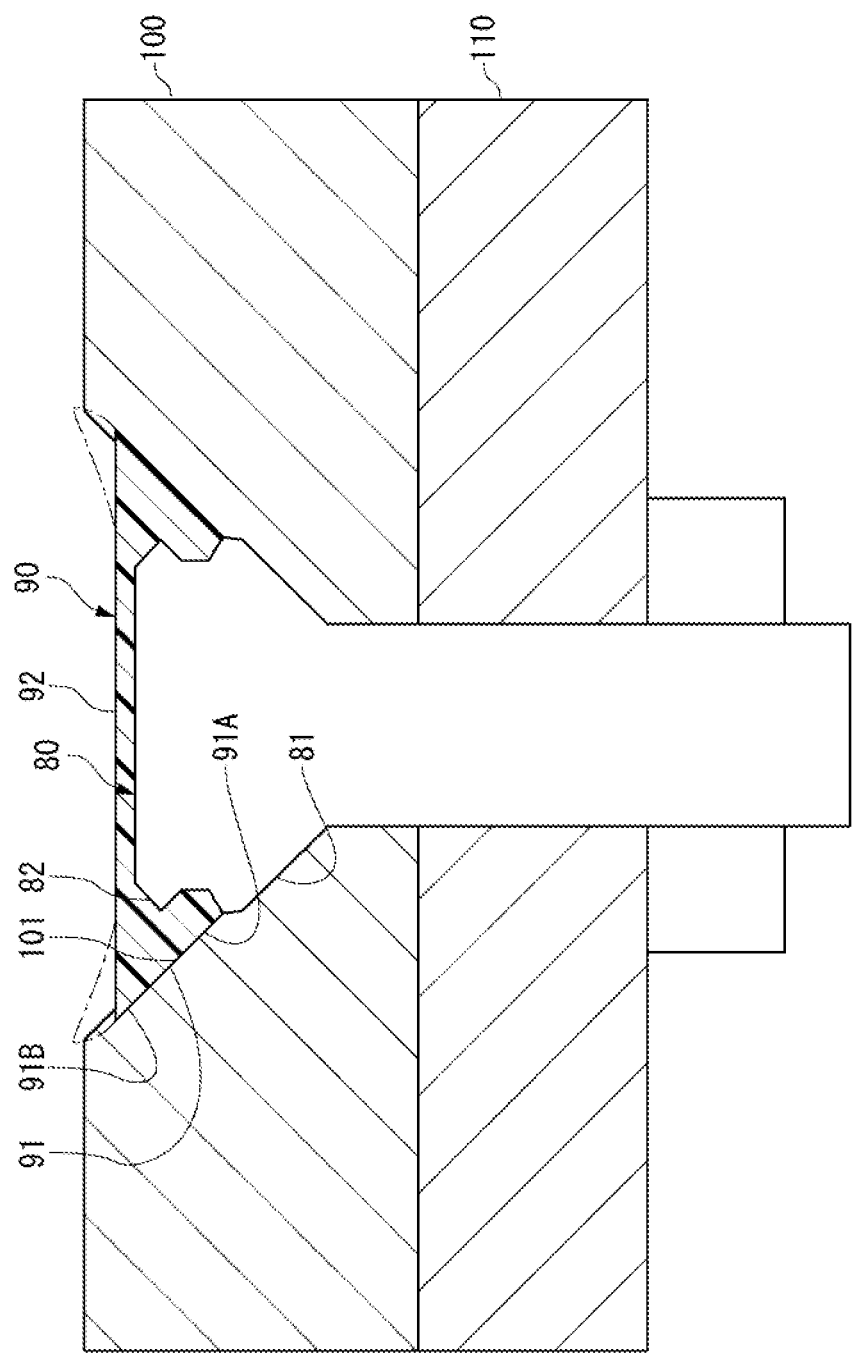
FIG. 7 is a schematic view illustrating a lightning protection fastener of the prior art.

Alternatively, as shown in FIG. 6, the insulating seat surface 321 may be provided with a projection 321A at the outer periphery (near the outer surface 4A) which projects toward the receiving surface 41. When the fastener body 2 is tightened, the projection 321A is pressed against the receiving surface 41 while the other part of the insulating seat surface 321 merely comes into contact with the receiving surface 41.

The insulating seat surface 321 provided with the projection 321A in this manner can achieve a higher contact pressure between the insulating seat surface 321 and the receiving surface 41 while preventing the upward warp of the insulating member 30 as much as possible. The thickness of the insulating top portion 31 may be thinner at the outer periphery where the projection 321A is located so that the insulating top portion 31 can be flatter after the fastener is tightened. In the embodiment shown in FIG. 6, the insulating top portion 31 includes an inclined portion such that the thickness of the insulating top portion 31 is smaller at its outer peripheral edge 311 than at its center portion 312.

The present invention encompasses embodiments in which the insulating top portion 31 includes an inclined portion, on the premise that the embodiments feature the insulating seat surface 321 retracted from the plane of the fastener seat surface 211.

A fastener according to the present invention is generally applicable to any structural member made of fiber reinforced plastics. Specifically, such a structural member only requires that it have a main structure made of fiber reinforced plastics.

What is claimed is:

1. A lightning protection fastener for fastening an outer panel to a support member, the outer panel being made of a fiber reinforced plastic material, and the support member supporting a backside of the outer panel, comprising: a fastener body made of a metal, the fastener body including a shaft portion passing through the outer panel and the support member, and a head portion located on an outer surface side of the outer panel; and an insulating member made of an insulating plastic material and mounted to the head portion, wherein the head portion has a seat surface forming a frusto-conical shape, wherein the outer panel has a receiving surface conforming to the seat surface, such that the seat surface comes into contact with the receiving surface as the fastener is tightened on the outer panel, wherein the insulating member has an insulating inclined portion forming a contact surface which is spaced apart from a plane of the seat surface, such that, when a portion of the receiving surface which opposes the seat surface is depressed by the fastener body, the contact surface comes into contact with the receiving surface, wherein the depression of the receiving surface creates a gap between the insulating inclined portion, the outer panel, and the fastener body, and the gap is filled with an insulating sealant, and wherein the contact surface comes into contact with the receiving surface with a predetermined contact pressure that makes the insulating member remain flat at an outer edge of the outer panel.

2. The lightning protection fastener according to claim 1, wherein the contact surface is formed parallel to the seat surface and at a separation distance spaced apart from the seat surface.

3. The lightning protection fastener according to claim 1, wherein an insulating sealant is provided for filling a space between the receiving surface and the insulating member, the space being located in the outer surface side from the contact surface.

4. An aircraft comprising:
an outer panel made of a fiber reinforced plastic material,
a support member for supporting the backside of the outer panel, and
the lightning protection fastener according to claim 1 for fastening the outer panel to the support member.

5. The aircraft according to claim 4, wherein the outer panel is depressed when the lightning protection fastener, passing through the outer panel and the support member, is tightened on the outer panel.

6. The lightning protection fastener according to claim 1, wherein the predetermined contact pressure makes the insulating member remain flat at the outer edge without being warped at the outer edge.

7. The lightning protection fastener according to claim 1, wherein the insulating inclined portion forming the contact surface is inclined to the seat surface at a separation distance, wherein the separation distance gradually decreases from a border between the seat surface and the contact surface to the outer surface side of the outer panel.

* * * * *